United States Patent [19]
Andruchiw

[11] 4,146,258
[45] Mar. 27, 1979

[54] SEALING DEVICE FOR ELECTRICAL METER

[75] Inventor: Roman Andruchiw, Willowdale, Canada

[73] Assignee: Step-Rite Limited, Willowdale, Canada

[21] Appl. No.: 845,318

[22] Filed: Oct. 25, 1977

[30] Foreign Application Priority Data

Oct. 29, 1976 [CA] Canada .................................. 264615

[51] Int. Cl.$^2$ ...................... B65D 45/30; B65D 45/32
[52] U.S. Cl. ............................... 292/256.6; 220/82 R; 220/319; 403/338; 285/407; 215/274; 324/156; 361/369
[58] Field of Search ............... 220/82 R, 319, 320, 220/298; 215/274, 275; 403/338, 2, 313; 292/256.67, 256.6; 285/407, 420; 324/156; 361/369

[56] References Cited
U.S. PATENT DOCUMENTS

| | | |
|---|---|---|
| 3,602,533 | 8/1971 | Starr .............................. 292/256.6 X |
| 3,861,180 | 1/1975 | Heckrotte, Sr. et al. ........ 403/338 X |

*Primary Examiner*—George T. Hall
*Attorney, Agent, or Firm*—James T. Wilbur

[57] ABSTRACT

The sealing device is used to interconnect a base of an electrical meter of the type having a transparent enclosure secured to the base and a flange connected to and spaced outwardly from a meter socket. The device includes concentrically disposed inner and outer bands. The inner band is provided with spaced apart limbs which straddle the base and flange and thereby interconnect them. The inner band is also provided with flaps which contact the adjacent inner wall of the outer band. The flaps permit movement of the outer band to a position in which it maintains the inner band in place but resists movement of the outer band away from such position.

15 Claims, 13 Drawing Figures

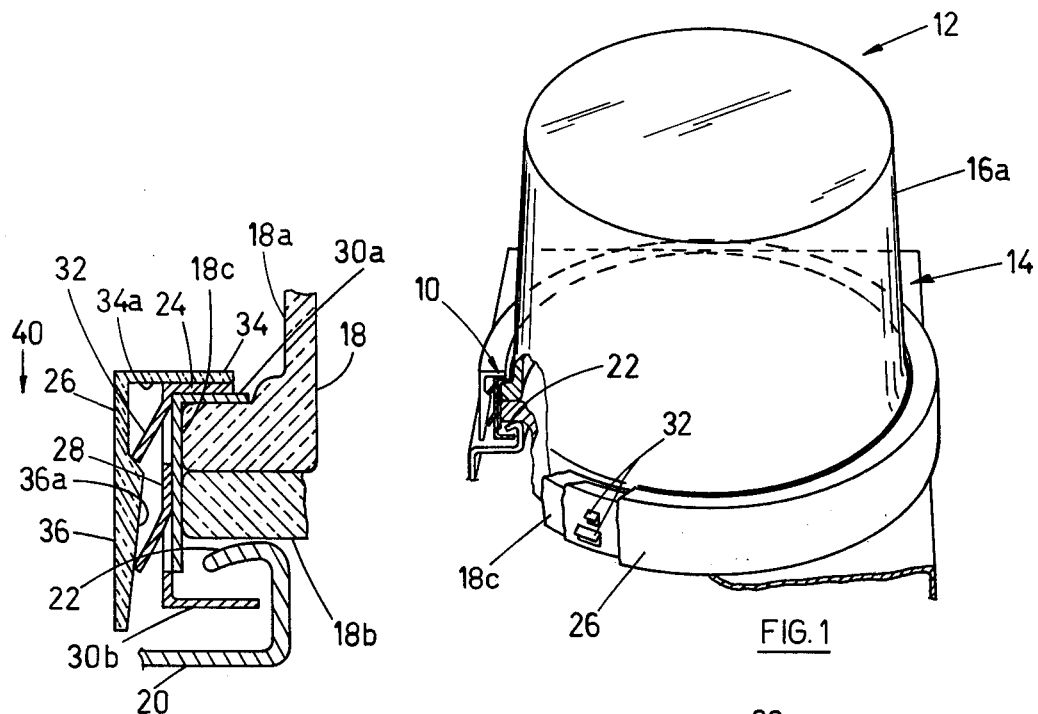
FIG. 1
FIG. 2
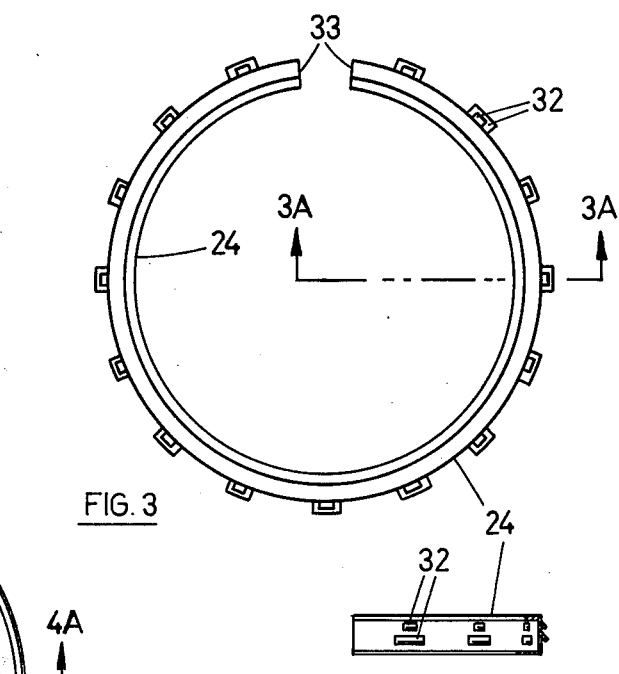
FIG. 3
FIG. 3A
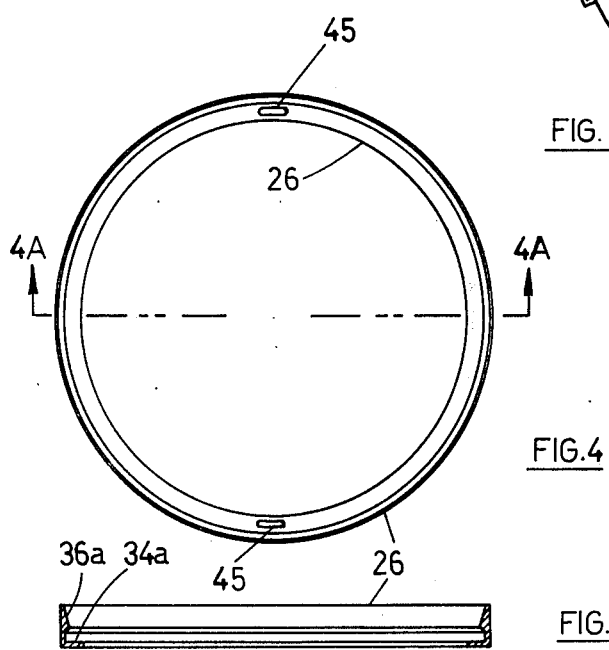
FIG. 4
FIG. 4A

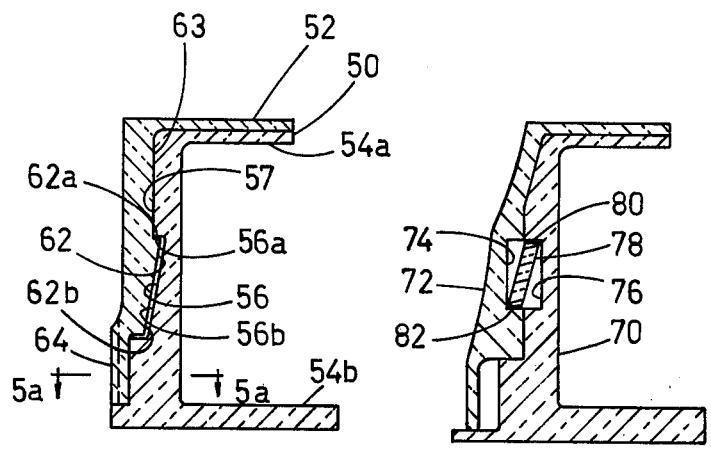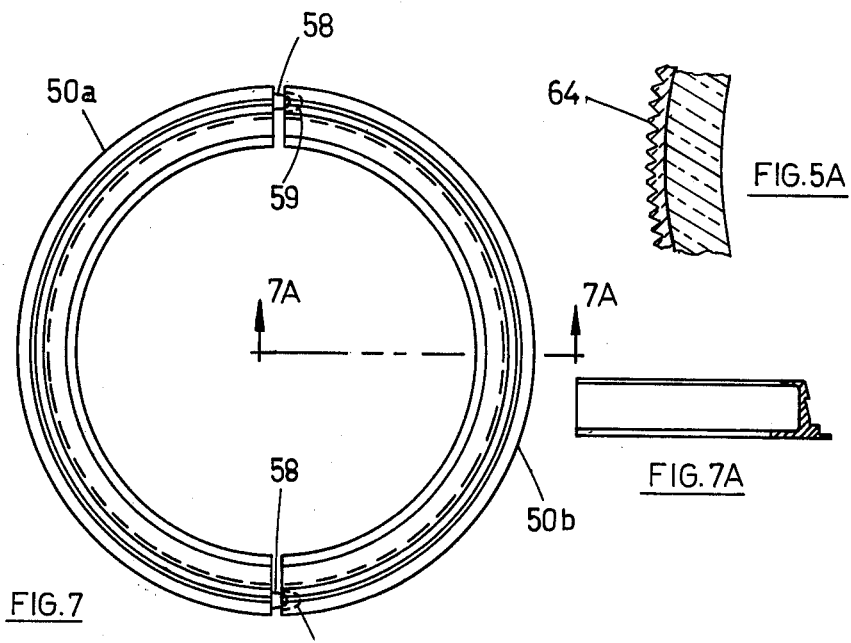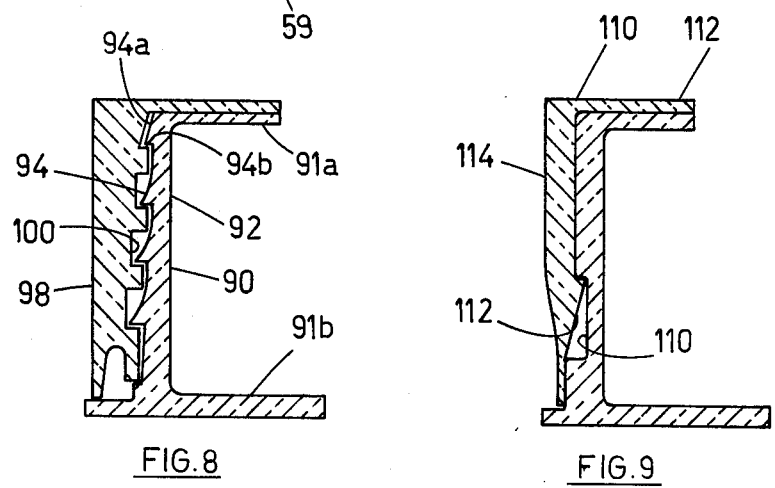

SEALING DEVICE FOR ELECTRICAL METER

BACKGROUND OF THE INVENTION

This invention relates generally to devices for preventing electrical meters from being tampered with. More particularly the invention relates to a sealing device for interconnecting an electrical meter and a junction box or meter socket such that unauthorized separation of the two can be readily detected.

Conventional electrical meters and various other kinds of meters are sealed in an enclosure from which readings can be taken without removal of any parts of the meters. The meters usually consist of a cylindrical-shaped glass enclosure which accommodates the inner mechanism and which has a radially outwardly extending base. The base is seated upon a rim or flange of a meter socket and the base and rim are interconnected by a seal. Prongs extend from beneath the base of the electrical meter and are adapted to fit into conforming female receptacles which are disposed on the meter socket.

The means for sealing the rim and the base of the electrical meter is conventionally in the form of a discontinuous ring having overlapping ends disposed one inside the other. The ring is positioned concentrically about the meter such that it straddles the base and the rim and prevents their being separated unless the ends of the ring are separate. To prevent unauthorized separation the end of the ring which is disposed inside the other end is provided with an ear which projects through a slot cut into the other end. A wire is passed through an aperture formed in the ear and the ends of the wire are interconnected by a metallic seal which is too large to pass through the slot. The metallic seal thus prevents the two ends of the seal from being separated.

A serious shortcoming of the metallic seal is that it does not secure the ends of the wire with sufficient tenacity. The ends usually can with effort be removed from the seal either by, for example, grasping the seal with a pair of pliers and forcing the seal and wires apart or by rotating the wires adjacent the seal to enlarge the opening in the seal through the ends of the wire pass so that the ends may be withdrawn from the seal. The metallic seal is thus not a reliable means of preventing unauthorized removal of the electrical meter from the meter base.

SUMMARY OF THE INVENTION

It is an object of this invention to provide a sealing apparatus which, when installed, cannot be removed without leaving tell-tale marks. Unauthorized tampering with the electrical meter can, as a result, be readily detected.

Another object of this invention is to provide a sealing mechanism which is simple to install and to remove. The mechanism is simple and inexpensive of construction and is formed from readily available material.

These and other objects are accomplished by a sealing apparatus for interconnecting a base of an electrical meter of the type having an enclosure connected to the base and a flange connected to and spaced outwardly from a meter socket, the sealing apparatus comprising: an inner band having first and second spaced apart limbs adapted to be disposed adjacent oppositely facing surfaces of the base and the flange respectively to thereby interconnect the electrical meter and the meter socket; an outer band moveable to an interconnecting position in which the outer band is in apposition to the inner band such that the outer band maintains the inner band adjacent the base and the flange; and at least one wall-engaging element which is adapted to be interposed between the inner and outer bands and which, when the outer band is in the interconnecting position resists movement of the outer band away therefrom.

DESCRIPTION OF THE DRAWINGS

The invention will now be described further with reference to the accompanying drawings in which:

FIG. 1 is a perspective view, partly cut away, of a preferred embodiment of the sealing apparatus of the invention shown in conjunction with an electrical meter and a meter socket;

FIG. 2 is a section of the sealing apparatus and a portion of the electrical meter and meter socket;

FIG. 3 is a plan view of an inner band which forms one of the components of the sealing apparatus of the invention;

FIG. 3A is a section and elevation on line 3A—3A of FIG. 3;

FIG. 4 is a plan view of an outer band which forms another component of the sealing apparatus;

FIG. 4A is a section and elevation of line 4A—4A of FIG. 4;

FIG. 5 is a section of an alternative embodiment of the sealing apparatus of the invention;

FIG. 5A is an elevation of a portion of the outer band illustrated in FIG. 5;

FIG. 6 is a further embodiment of the sealing apparatus;

FIG. 7 is a plan view of the inner band illustrated in FIG. 5;

FIG. 7A is a section on line 7A—7A of FIG. 7; and

FIGS. 8 and 9 are still further embodiments of the sealing apparatus.

Like reference characters refer to like parts throughout the description of the drawings.

DESCRIPTION OF THE PREFERRED EMBODIMENTS

With reference to FIG. 1, the sealing apparatus of the invention indicated generally by the numeral 10 is shown in conjunction with a conventional electrical meter, generally 12, and a meter socket, generally 14. The meter consists of a glass enclosure 16 having a generally cylindrical upper portion 16a and a radially outwardly extending base 18. The base consists of upper and lower glass segments 18a, 18b and an annular collar 18c. The meter is provided with prongs (not illustrated) which are adapted to be removably inserted into conforming female receptacles in the meter socket (also not illustrated) to electrically interconnect the meter and the meter socket.

The base of the electrical meter is seated upon a circular rim 20 attached to the upper wall of the meter socket. A circular flange 22 of approximately the same diameter as that of base 18 is formed on the upper portion of the rim and the flange is spaced apart from the upper wall of the meter socket.

Sealing apparatus 10 interconnects the base 18 of the electrical meter with flange 22 and consists of two circular concentric bands, an inner band 24 and outer band 26. With reference first to the inner band and to FIG. 2, the band consists of a web 28 and a pair of parallel first and second limbs 30a and 30b which extend outwardly from one side of the web. The diameter of the web is slightly greater than that of the base and the spacing of the limbs is such that the band may be positioned concentrically about the base 18 and flange 22 so that its limbs are disposed adjacent oppositely facing surfaces thereof. When so positioned the limbs of the inner band straddle the base and flange and serve to interconnect the electrical meter and a meter socket.

A plurality of flaps or wall-engaging elements 32 extend outwardly at an oblique angle from the other side of web 28. As illustrated in FIG. 3, the flaps are arranged in two rows which extend circumferentially about the band. Each flap in each row is disposed vertically above or below a flap in the other row.

Inner band 24 is discontinuous, having a pair of spaced apart ends 33. The band is composed of material which is suffiently flexible that it can be opened by separation of its ends and connected to the base of the electrical meter and the flange as illustrated in FIGS. 1 and 2. The band is preferably composed of stainless steel, acrylic or plexiglas.

The outer band 26 is L-shape in section having a pair of arms 34,36 disposed at right angles to each other. The diameter of arm 36 is larger than that of web 28 so that the outer and inner bands may be disposed concentrically as illustrated in FIGS. 1 and 2. The inner wall 34a of arm 34 is oriented at right angles to the adjacent portion of the other inner wall 36a. The outer portion of inner wall 36a however is bevelled, being oriented at an oblique angle relative to the inner portion. As illustrated in FIG. 4, the outer band is continuous unlike the inner band which is discontinuous and is preferably composed of frangible material which is easily chipped or broken when tampered with. Brittle polymeric material such as acrylic or plexiglas is preferred. More preferably the material is composed of material having the same co-efficient of expansion as the inner band.

A slot 45 is cut into the outer band so that the band may be readily fractured and removed from the position illustrated in FIGS. 1 and 2 by inserting a screw driver or knife into the slot and turning it to break the band. In this way the sealing apparatus may be readily removed to permit adjustment or maintenance of an electrical meter. Of course the outer band may be provided with other means for facilitating its removal such as an area of weakness which may be readily fractured by a hammer.

To connect the sealing apparatus of the subject invention to an electrical meter and a meter base, the inner band is positioned adjacent and concentric with the base 18 of the electrical meter. Ends 33 are then separated sufficiently to permit positioning of the limbs of the band such that they straddle the base 18 and the flange 22 as illustrated in FIG. 2. Afterward the outer band is placed adjacent to the inner band and is forced downward in the direction of arrow 40 to the position illustrated in FIG. 2 in which it is in apposition to inner band 24. In forcing the outer band to such position, its inner wall 36a contacts flaps 32 and causes them to rotate toward web 28. No further downward movement is possible when arm 34 comes into contact with the limb of the inner band.

Removal of the outer band from the position illustrated in FIGS. 1 and 2 is resisted by flaps 32 since when force is applied to the outer band to cause it to move in an upward direction, the inner wall 36a will force the flaps to rotate away from the plane of the web and into firmer contact with the inner wall. Only by applying a relatively large force to the outer band can it be moved in such direction and any such movement can be readily detected since it will cause visible damage to the outer band. Where the outer band is composed of material such as acrylic or plexiglas which shatters when forced upwardly as described, the only way it can be removed is by breaking it.

As indicated previously, the flaps are arranged in two circular rows and the flaps in each row are disposed vertically above or below the flaps in the other row. In this way the outer band cannot be removed by inserting a knife or like implement into the space between the two bands and prying the flaps inward since the flaps in the lower row prevent the knife from reaching the flaps in the upper row.

With reference to FIG. 5 the illustrated sealing device consists of two circular concentric bands, an inner band 50 and an outer band 52. The inner band is provided with first and second limbs 54a, 54b which, like the limbs of the inner band illustrated in FIG. 2, are adapted to be positioned adjacent oppositely facing surfaces of the base of an electrical meter and the flange of a meter socket. A recess 56 is formed on the outer wall 57 of the band and extends circumferentially thereabout. The recess is made up of a radially inwardly extending first surface 56a and a bevelled second surface 56b. The diameter of the outer wall adjacent limb 54a is less than that adjacent limb 54b.

As illustrated in FIG. 7, inner band 50 is composed of two separate semi-circular segments 50a, 50b which together define a complete circle. The two segments are interconnected by means of tapered lugs 58 which extend outwardly from the ends of segment 50a and which are removably accommodated in conforming holes 59 formed in each end of segment 50b.

The inner band may be composed of relatively inelastic material and is segmented to permit positioning thereof about the base of an electrical meter and the flange of a meter socket. Of course the inner band may alternatively be composed of more than two segments.

Outer band 52 is provided with a wall-engaging element 62 on its inner wall 63. The element is defined by a radially inwardly extending first surface 62a which terminates at a bevelled second surface 62b. The latter surface increases in diameter with increasing diameter from the first surface 62a. The outer wall of the band adjacent its lower edge is serrated at 64 to weaken it so that it will readily fracture if an attempt is made to remove the outer band by prying the lower edge outward.

The outer band is composed of material which is resiliently flexible or deformable so that it will radially expand or stretch sufficiently without rupturing when the outer band is forced from a position in which it is disposed coaxially beside the inner band to the position illustrated in FIG. 5 in which it is disposed concentrically about the inner band. As the outer band is moved, the wall-engaging element 62 contacts and is forced radially outward by the outer wall 57 of the inner band. When the element reaches or faces the recess 56, the outer band contracts radially inward and resumes its normal or substantially normal undeformed state whereby the wall-engaging element enters the recess and locks the outer band about the inner band. The outer band is then in an interconnecting position in which the electrical meter and meter base are joined.

Of course the sealing device illustrated in FIG. 5 will operate equally as satisfactorily where the outer band is not flexible or deformable but where the inner band is.

In the latter case the inner band will contract radially when the outer band is forced to the interconnecting position illustrated in FIG. 5 as long as there is sufficient space between the inner band and the base and flange of the electrical meter and meter socket to permit such contraction.

The sealing device illustrated in FIG. 5 will also operate satisfactorily where both the outer and inner bands are flexible. As long as the outer band, once in an interconnecting position, cannot be removed without fracturing or without leaving a permanent tell-tale mark, it does not matter whether both bands are flexible or whether one but not both is flexible.

The length of bevelled second surface 62b will be adjusted according to the resiliency of whichever of the bands is flexible and according to the degree of interference between the two bands. If the flexible band is highly elastic or if there is relatively little interference between the two bands, the surface should be relatively long to ensure that the flexible band cannot be stretched sufficiently, once the outer band is in position about the inner band, to permit the outer band to be removed without fracturing. Conversely, if the band is relatively inelastic or if the interference between the two bands is slight, surface 62b will be relatively short so that placement of the outer band about the inner band will not cause the outer band to fracture.

In the embodiment illustrated in FIG. 6, the inner and outer bands 70,72 are composed of relatively inelastic material. The inner band, like inner band 50 illustrated in FIG. 7 is composed of two or more segments while the outer band is continuous. Rececces 74,76 are formed in the inner and outer walls respectively of the outer and inner bands.

A wall-engaging element 78 is accomodated in the two recesses 74,76. The element is in the form of a continuous or discontinuous ring and is composed of resilient material such as spring steel or plastic. The element is disposed at an oblique angle relative to the axes of the two bands 70,72 and has oppositely facing edges 80,82 which contact walls of the inner and outer recesses 76,74 respectively and thereby lock the outer band concentrically about the inner band.

Attachment of the sealing device illustrated in FIG. 6 involves first placing the segments of the inner band 70 so that they surround and straddle the base of the electrical meter and the flange of the meter socket. The wall-engaging element 78 is then flexed sufficiently so that it can be positioned in recess 76. The upper edge 80 of the element will thus be within the recess but the lower edge 82 will be outside the recess. The outer band is then positioned coaxially side by side above the inner band and the former band is forced downward to cause its inner wall to flex the wall-engaging element inward. When the recess 74 of the outer band faces the recess of the inner band, the lower edge of the wall-engaging element will spring outward thereby locking the two bands together.

With reference to FIG. 8 the sealing device illustrated therein consists of an inner band 90 having spaced first and second flanges 91a, 91b and a web 92. A plurality of spaced-apart wall-engaging elements 94 are disposed side by side on the outer wall of the web. The diameter of the element closest to flange 91a at the juncture between the first and second surfaces 94a,94b is least and the diameter of succeeding elements increases with increasing distance from the flange. Each wall-engaging element is of the same construction as well-engaging element 62 illustrated in FIG. 5, except that the elements are formed on the inner band whereas the element illustrated in FIG. 5 is formed on the outer band.

On the inner wall of the outer band web 98 a plurality of recesses 100 are formed. The inside diameter of successive recesses increases with increasing distance from flange 91a to accommodate the wall-engaging elements but unlike the recess illustrated in FIG. 5, the recesses do not conform to the shape of the wall-engaging elements but are somewhat larger.

The operation of the sealing device of FIG. 8 is similar to that of the device illustrated in FIG. 5 in that when a force is applied to the outer band to cause it to move into a coaxial relationship with the inner band, the wall-engaging elements contact the inner wall of the outer band and cause whichever of outer or inner band is resiliently deformable to increase or decrease in diameter respectively. When the outer band is in the illustrated position in which it is interconnected with the inner band, the wall-engaging elements face the recesses and whichever of the bands is deformable resumes its normal position to thereby lock the outer band concentrically about the inner band.

The sealing apparatus illustrated in FIG. 9 is similar to that illustrated in FIG. 5 except that recess 110 does not conform to the shape of the wall-engaging element 112 but, like the recesses illustrated in FIG. 8, is larger than the wall-engaging element.

It will be understood of course that modifications can be made in the preferred embodiments of the invention described and illustrated herein without departing from the scope and purview of the invention as defined in the appended claims.

What I claim as new and desire to protect by Letters Patent of the United States is:

1. A sealing apparatus for interconnecting a base of an electrical meter of the type having an enclosure connected to said base and a flange connected to and spaced outwardly from a meter socket, said sealing apparatus comprising: an inner band having first and second spaced apart limbs adapted to be disposed adjacent oppositely facing surfaces of said base and said flange respectively to thereby interconnect the electrical meter and the meter socket; an outer band moveable to an interconnecting position in which said outer band is in apposition to said inner band such that said outer band maintains said inner band adjacent said base and said flange; and at least one wall engaging element which is adapted to be interposed between said inner and outer bands and which, when said outer band is in said interconnecting position, resists movement of said outer band away therefrom.

2. A sealing apparatus for interconnecting a base of an electrical meter of the type having an enclosure connected to said base and a flange connected to and spaced outwardly from a meter socket, said sealing apparatus comprising: inner and outer bands, at least one of which being resiliently deformable such that movement of said outer band to an interconnecting position in which said outer band is disposed outward of said inner band causes whichever of said outer or inner band is deformable to expand or contract respectively, said inner band having first and second spaced apart limbs adapted to be disposed adjacent oppositely facing surfaces of said base and said flange respectively to thereby interconnect the electrical meter and the meter socket; and at least one wall engaging element which is adapted to be interposed between said inner and outer band and which when said outer band is in said interconnecting position resists movement of said outer band away therefrom.

3. A sealing apparatus for interconnecting a base of an electrical meter of the type having an enclosure connected to said base and a flange connected to and spaced outwardly from a meter socket, said sealing apparatus comprising: annular inner and outer bands, at least one of which being resiliently deformable such that movement of said outer band to an interconnecting position in which said outer band is disposed radially outward of said inner band causes whichever of said outer or inner band is deformable to expand or contract radially respectively, said inner band having first and second spaced apart limbs adapted to be disposed adjacent oppositely facing surfaces of said base and said flange respectively to thereby interconnect the electrical meter and the meter socket; and at least one wall-engaging element which is adapted to be interposed between said inner and outer bands and which, when said outer band is in said interconnecting position resists movement of said outer band away therefrom.

4. The sealing apparatus as claimed in claim 1 wherein said wall-engaging element is formed on said inner band and contacts an inner wall of said outer band when the latter band is in said interconnecting position.

5. The sealing apparatus as claimed in claim 1 wherein said wall-engaging element is formed on said outer band and contacts an outer wall of said inner band when the outer band is in said interconnecting position.

6. The sealing apparatus as claimed in claim 1 wherein said inner band is provided with a web from one side of which extend said limbs and from the opposite side of which extends said wall-engaging element, said outer band when moved to said interconnecting position contacting the wall-engaging element and causing the latter to move toward the web, said outer band when forced away from said interconnecting position causing said wall-engaging element to move away from said web and into firm contact with said outer band whereby such force is resisted and further such movement is inhibited.

7. The sealing apparatus as claimed in claim 1 wherein said inner band is provided with a web from one side of which extend said limbs and from the opposite side is formed said wall engaging element, said element being in the form of a flap which extends outwardly at an oblique angle relative to said web, said outer band being generally L-shaped and having a pair of arms each having an inner wall, one said wall being disposed, at least in part, at an oblique angle relative to the other said inner wall, said outer band when moved in a direction toward said interconnecting position causing contact of said one inner wall with the flap with resulting movement of the latter toward the web and when in said interconnecting position being prevented from further movement in said direction by contact of said other inner wall with one limb of said inner band, said outer band being inhibited from movement away from said interconnecting position in the opposite said direction by said flap which contacts said one inner wall and which upon such movement is caused to move away from said web and into firm contact with said one inner wall.

8. The sealing apparatus as claimed in claim 1 wherein said inner band is formed of at least two separate segments which are adapted to be disposed side by side when said outer band is in said interconnecting position.

9. The sealing apparatus as claimed in claim 1 wherein said outer band is frangible and cannot be moved from said interconnecting position without fracturing.

10. The sealing apparatus as claimed in claim 2 wherein said wall-engaging element extends inwardly from an inner wall of said outer band and said inner band has a recess formed on an outer wall thereof, said wall-engaging element contacting said inner band as said outer band is moved toward said interconnecting position and thereby causing expansion or contraction of whichever of said outer and inner bands respectively is resiliently deformable, said wall-engaging element when said outer band reaches said interconnecting position, facing said recess and no longer causing said resilient deformation whereupon whichever of said outer and inner bands is deformable at least substantially resumes its undeformed state whereupon said wall-engaging element enters said recess and locks said outer band about said inner band.

11. The sealing apparatus as claimed in claim 2 wherein said wall-engaging element extends outwardly from an outer wall of said inner band and said outer band has a recess formed on an inner wall thereof, said wall-engaging element contacting said outer band as the latter band is moved toward said interconnecting position and thereby causing expansion or contraction of whichever of said outer and inner bands respectively is resiliently deformable, said wall-engaging element when said outer band reaches said interconnecting position, facing said recess and no longer causing said resilient deformation whereupon whichever of said outer and inner bands is deformable at least substantially resumes its undeformed state whereupon said wall-engaging element enters said recess and locks said outer band about said inner band.

12. The sealing apparatus as claimed in claim 1 wherein a recess is formed in each of an inner wall of said outer band and in an outer wall of said inner band, said inner and outer band recesses together, when said outer band is in said interconnecting position, forming a space for accommodation of said wall wall-engaging element, said element having a pair of oppositely facing edges each adapted to contact respective walls of said inner and outer band recesses thereby locking said outer band about said inner band.

13. The sealing apparatus as claimed in claim 10 wherein a plurality of said wall-engaging elements are spaced along the inner wall of said outer band and a plurality of said recesses are spaced along the outer wall of said inner band.

14. The sealing apparatus as claimed in claim 11 wherein a plurality of said wall-engaging elements are spaced along the outer wall of said inner band and a plurality of said recesses are spaced along the inner wall of said outer band.

15. The sealing apparatus as claimed in claim 7 wherein a plurality of said flaps are formed on said web, said webs being arranged in at least two rows, each flap in one said row being disposed directly above or below one said flap in the other said row.

* * * * *